United States Patent
Mitts et al.

(10) Patent No.: US 6,671,283 B1
(45) Date of Patent: *Dec. 30, 2003

(54) METHOD FOR FLEXIBLE USE OF A TREE TOPOLOGY IN A WIRELESS ATM SYSTEM

(75) Inventors: Håkan Mitts, Helsinki (FI); Harri Hansen, Espoo (FI); Jukka Immonen, Espoo (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,321

(22) Filed: Dec. 18, 1997

(30) Foreign Application Priority Data

Dec. 20, 1996 (FI) .................................. 965149

(51) Int. Cl.⁷ .............................................. H04L 12/56
(52) U.S. Cl. ..................... 370/408; 370/256; 370/401
(58) Field of Search ............................ 370/254, 255, 370/256, 216, 395, 400, 408, 409, 257, 258, 351, 389, 392, 401, 402, 410

(56) References Cited

U.S. PATENT DOCUMENTS

| | | |
|---|---|---|
| 5,345,448 A | 9/1994 | Keskitalo .................. 370/95.3 |
| 5,410,733 A | 4/1995 | Niva et al. ................. 455/33.2 |
| 5,483,668 A | 1/1996 | Malkamaki et al. ....... 455/33.2 |
| 5,524,009 A | 6/1996 | Tuutijarvi et al. ......... 370/95.3 |
| 5,528,583 A | 6/1996 | Acampora et al. ............ 370/54 |
| 5,694,591 A * | 12/1997 | Du et al. ..................... 395/602 |
| 5,805,578 A * | 9/1998 | Stirpe et al. ................ 370/255 |
| 5,831,975 A * | 11/1998 | Chen et al. ................. 370/256 |
| 5,872,773 A * | 2/1999 | Katzela et al. ............. 370/256 |
| 5,933,412 A * | 8/1999 | Choudhury et al. ........ 370/218 |
| 5,940,396 A * | 8/1999 | Rochberger ................ 370/408 |

FOREIGN PATENT DOCUMENTS

EP 0749261 A2 12/1996

OTHER PUBLICATIONS

"Private Network–Network Interface Specification Version 1.0" by The ATM Forum.

"An Architecture and Methodology for Wireless–Executed Handoff in Cellular ATM Networks", Acampora et al., IEEE Journal on Selected Areas in Communications, vol. 12, No. 8, Oct. 1994, p. 1365.

* cited by examiner

Primary Examiner—Douglas Olms
Assistant Examiner—Brian Nguyen
(74) Attorney, Agent, or Firm—Perman & Green, LLP

(57) ABSTRACT

The invention relates generally to procedures facilitating the routing in a network-structured telecommunications network. In the network structure according to the invention, connections are established by using a predetermined partial group of connections forming a tree topology. Advantageously the number of said predetermined tree topologies is more than one, in which case the node starting the setup of the connection chooses the tree topology to be used in establishing the connection in question. Thus the advantages offered by the tree topology can be flexibly utilised in a network-structured telecommunications network.

7 Claims, 4 Drawing Sheets

Figure 1:
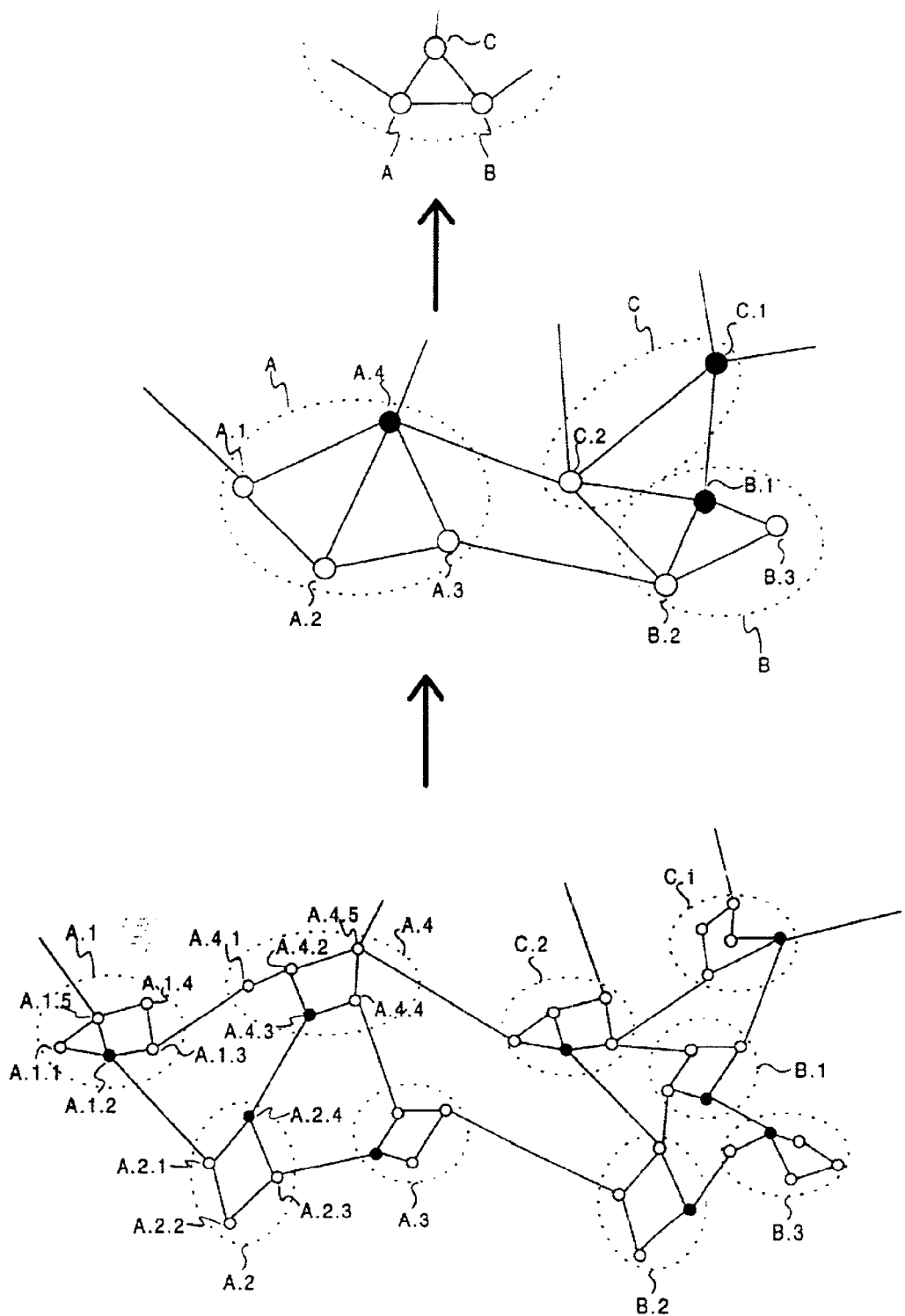

Prior Art  Fig. 1

METHOD FOR FLEXIBLE USE OF A TREE TOPOLOGY IN A WIRELESS ATM SYSTEM

The invention relates generally to the routing of connections in a telecommunications network.

The ATM (Asynchronous Transfer Mode) network is a data transmission system where data is transferred in digital form as 53-byte cells from one terminal to another through switches and rapid transfer connections therebetween. Each cell contains a 48-byte payload and a 5-byte header. In order to save space, the header information of each cell does not include complete address information describing the used data transfer route from the transmitting to the receiving device, but only information of the virtual path and channel where said data transfer connection is being carried. The switches or nodes of the network contain necessary routing information, on the basis whereof said identifiers of the virtual path and channel are interpreted as references to the respective node in succession.

It is to be expected that in the future the ATM network, which has so far been based mainly on cable connections, will also serve wireless terminals that are in contact with the network via radio base stations, i.e. access points. These terminals may move with respect to the base stations and their coverage area, in which case the system must be able to execute a handover when necessary. A specific feature of each ATM connection is the contract between the wireless terminal and the network as to the quality of service (QoS) required by the connection. This contract particularly covers the maximum length of the delays allowed in the connection and the highest allowed probability of cell loss. The agreed quality of service for the connection and its upkeep are important factors when making decisions as for the point of time of the handover and the new base station to be assigned for a given wireless terminal.

The PNNI protocol developed for the routing of a fixed ATM network defines how the switches of the ATM network can discover the network structure and transmit structural information to each other. The PNNI protocol also defines the routing method which—on the basis of said structural data, the offered traffic and the required quality of service for the connection, as well as the available resources—finds the most advantageous route to the new connection.

FIG. 1 illustrates an example of a network structure according to the PNNI protocol. According to the PNNI protocol, the switches or nodes of the ATM network are grouped into peer groups, and one of the nodes in the group serves as the peer group leader. In FIG. 1, the peer group leaders are marked with black circles. A peer group is formed by such nodes that have a common ancestor in the PNNI address and routing hierarchy. The PNNI network structure is multi-layered: the peer group of one level forms, on the successive higher level, one logical node. The nodes of the lowest level are physical switches of the ATM network. In the PNNI protocol, each node only knows the structure of its own peer group and of those higher-level peer groups to which the peer group of said node belongs.

In the PNNI protocol, each node maintains a database as for the structure of its own peer group and the connections of said peer group with other adjacent peer groups. For this purpose, the nodes transmit, at given intervals, information of their activity and their connections with other nodes via PTSE packages. Thus each node and peer group has real-time information of the network structure, so that for instance in the case of malfunction, the peer group is capable of changing the routing of connections past the damaged connection or node.

In FIG. 1, one peer group is formed for instance of the nodes A.1.1–A.1.5. On the next higher level, this peer group A.1 is represented by the logical node A.1. The nodes A.2.1–A.2.4 form another peer group A.2. On the higher level the logical nodes A.1–A.4, each of which represents a given lower-level peer group, form the peer group A.

For the sake of clarity, all nodes of all peer groups are not individually specified in FIG. 1. Such lines that in the illustrations of the present application—particularly in FIGS. 1 and 2—are attached to the node at one end only represent connections directed to outside the part of the network included in the drawing. The PNNI protocol is described in more detail for instance in the publication "Private Network—Network Interface Specification Version 1.0" by The ATM Forum.

A tree topology has clear advantages in realising a wireless ATM system, for instance in setting up new connections during handovers while the wireless terminal moves within the network, which is explained for instance in the publication "An Architecture and Methodology for Wireless-Executed Handoff in Cellular ATM Networks", A. S. Acampora and M. Naghshineh, IEEE Journal on Selected Areas in Communications, Vol. 12, No. 8, October 1994, p. 1365. Said publication introduces a network installed permanently in the form of a tree topology. This type of fixed tree topology has one root node, which is typically provided with a number of special functions and all connections are routed via the root node. Such a structure easily results in a non-optimal routing, which causes extra delays in the data transmission and resource losses in the data transmission network. In this type of structure, the root node also is easily overloaded.

In an embodiment of the radio part of an ATM network described above, such a tree topology is difficult to realise, because the wireless-specific switches supporting wireless terminals also participate in transmitting regular ATM connections. A regular ATM network typically has a network structure, as is illustrated in FIG. 1. To force the wireless-specific switches into a tree topology would disturb the transmission of regular telecommunications.

An object of the invention is to realise a structure whereby the above described drawbacks can be avoided. Another object of the invention is to introduce a method for facilitating routing in a network-structured data transmission network.

These objects are achieved by defining in the network structure a number of tree topologies, used in routing the connections, by arranging the switch that starts the routing to select the tree topology to be used from among a number of predetermined tree topologies, and by transmitting the identifier of the employed tree topology to all switches participating in the routing.

The data transmission network according to the invention—comprising switches and data transmission connections therebetween, so that at least a given part of the switches are arranged to control the connection routing to the data transmission network according to a predetermined tree topology composed of the switches of said data transmission network and of connections therebetween—is characterised in that each of said switches belonging to said at least a certain part of the switches is arranged to function as the anchor node of the tree topology during routing controlled by the switch in question.

The method according to the invention is characterised in that in said method, the switch serving as the anchor node of the tree topology controlling the routing is the switch from which the routing starts.

In the network structure according to the invention, connections are set up by using a predetermined partial group of connections constituting a tree topology. Advantageously the number of these predetermined tree topologies is larger than one, in which case the node starting the setup chooses the tree topology to be used in setting up the connection in question. Thus the advantages brought about by the tree topology can be flexibly utilised in a network-structured data transmission network.

Figure 2:
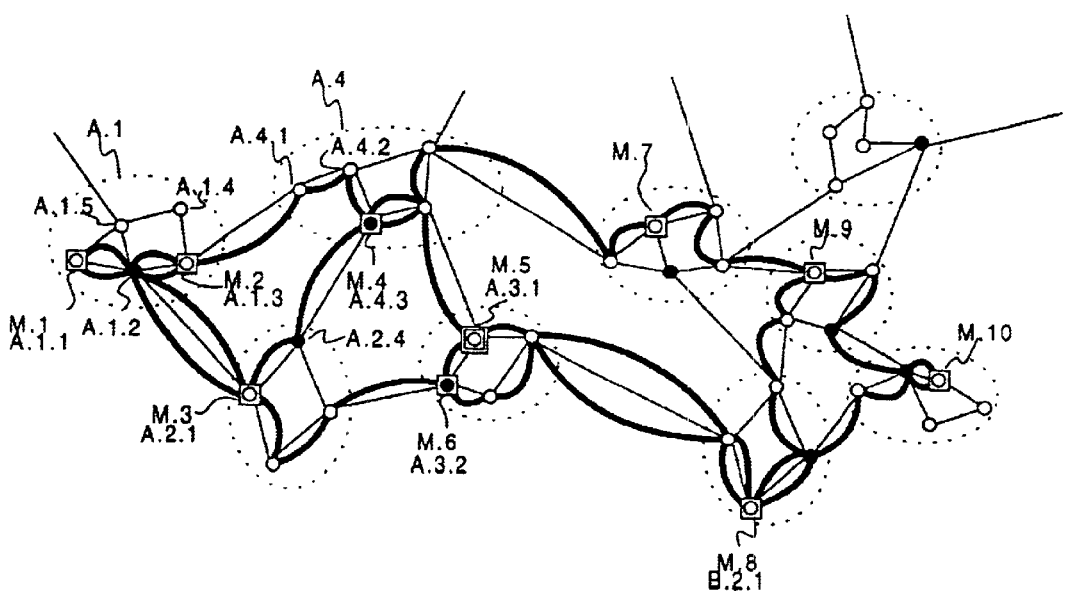
Figure 3A:
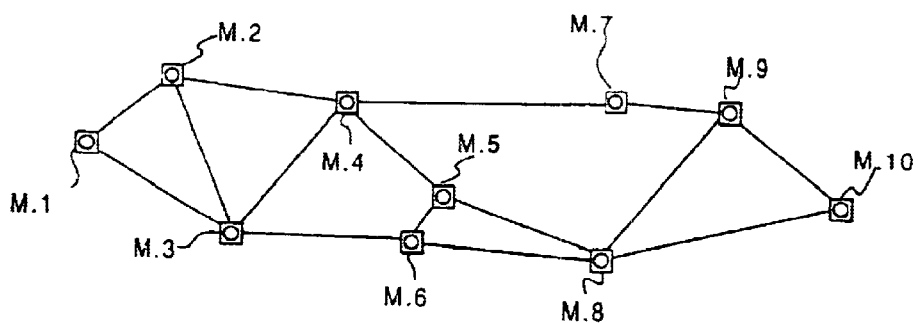
Figure 3B:
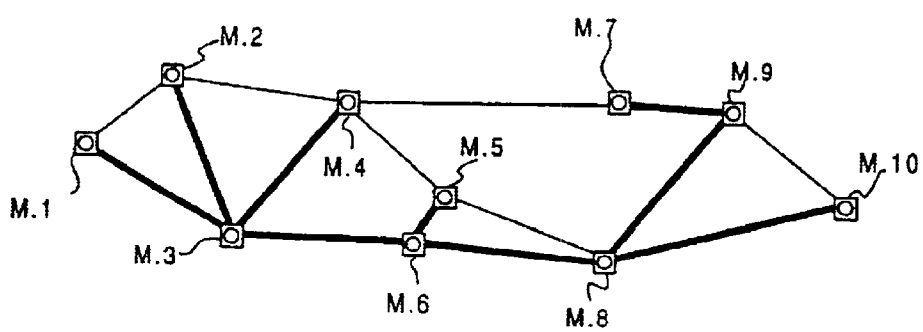
Figure 3C:
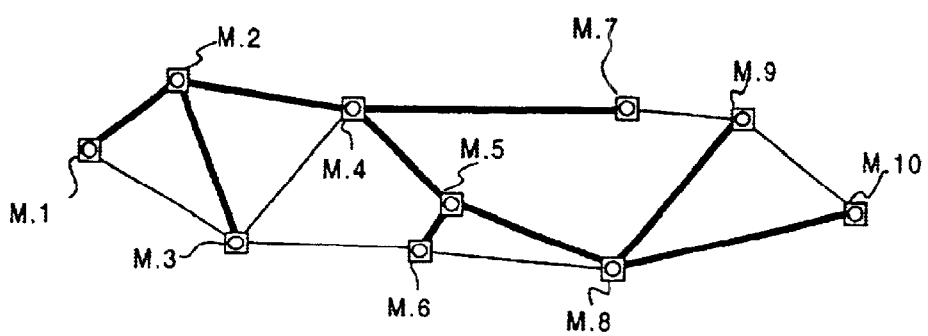
Figure 4A:
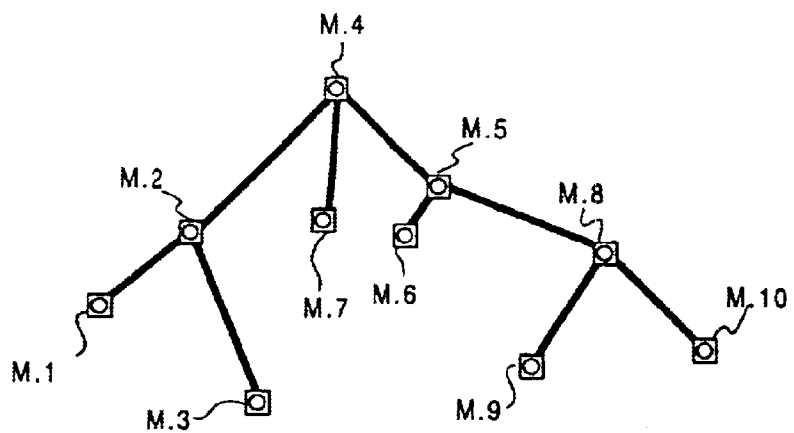
Figure 4B:
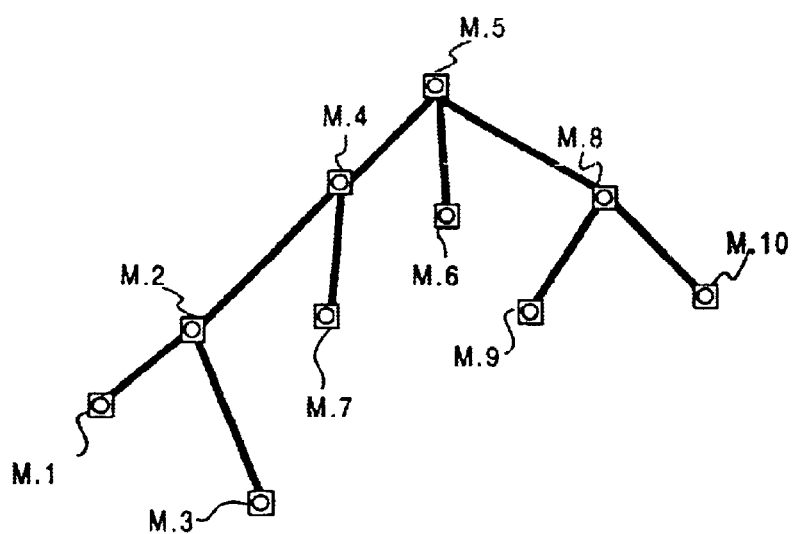

The invention is explained in more detail below, with reference to the exemplary preferred embodiments and the appended drawings, where FIG. 1 illustrates a prior art PNNI network structure, FIG. 2 shows an example of an ATM network realised so that part of the network supports wireless terminals, i.e. is wireless specific, FIG. 3a illustrates the structure of the wireless-specific peer group, shown in FIG. 2, FIG. 3b illustrates a tree topology that can, according to the invention, be used in the network structure of FIG. 3a, FIG. 3c illustrates another tree topology that can, according to the invention, be used in the network structure of FIG. 3a, FIG. 4a illustrates the tree topology of FIG. 3b, seen from the point of view of the switch M.4, and FIG. 4b illustrates the tree topology of FIG. 3b, seen from the point of view of the switch M.5.

Like numbers for like parts are used in the drawings.

In the routing of a connection, the system according to the invention utilises only connections belonging to a given predetermined tree topology. The system according to the invention may contain several such tree topologies, so that the node beginning the setup chooses the tree topology to be used in the routing of said connection from among a number of determined tree topologies. The node starting the setup may choose the tree topology to be employed for instance on the basis of the fact as to which tree topology's centre point is located nearest to the node in question. The node starting the setup adds the identifier of the tree topology to be employed to the setup commands it sends to other nodes, in which case all nodes participating in the setup know which tree topology is used in the routing of the connection in question.

The use of several tree topologies according to the invention in the control of the connection setups is particularly well suited to be applied in an ATM network, which is provided with a part of the wireless-specific network. This type of preferred embodiment is described in more detail below, with reference to FIG. 2.

FIG. 2 illustrates an example of a wireless network structure as applied in a fixed ATM network according to FIG. 1. The wireless-specific nodes are surrounded by squares in FIG. 2. The wireless-specific switches form a parallel peer group structure in relation to the rest of the PNNI structure. The wireless-specific switches belong both to a regular peer group and to a wireless-specific peer group. For instance in FIG. 2, the wireless-specific switch M.1 belongs both to the regular peer group A.1 as its member A.1.1 and to the wireless-specific peer group M. The leader of the wireless-specific peer group is marked with a double square. In this type of network structure, all switches do not have to support wireless terminals. Because the access points are connected only to such switches that support wireless terminals, i.e. wireless-specific switches, the movements of the wireless terminals are invisible outside the wireless-specific peer group. Therefore the switches outside the wireless-specific group do not need to be informed of the movements of the wireless terminals, and these regular switches can participate in the setting up and closing of the connections of the wireless terminal in similar fashion as with a regular fixed terminal. Thus one purpose of the wireless-specific groups is to limit the distribution of the reachability information of the wireless terminals only to switches utilising said information.

In between wireless-specific switches, there are provided logical connections (MCC, Mobility Control Channel) for the transmission of PNNI messages and other messages. These connections are marked with a thick line in FIG. 2. Via these connections, the switches can transmit information concerning wireless terminals inside the wireless-specific group. These connections pass, in the example of FIG. 2, in several locations through ordinary switches that only forward the traffic of these connections without otherwise participating in the signalling. The MC channels are advantageously similar to the routing control channels (RCC) of the PNNI protocol.

The wireless-specific groups can for instance form their own peer group hierarchy, according to the PNNI protocol, in parallel to the PNNI hierarchy of a regular ATM network. The wireless-specific group hierarchy can advantageously comprise additional switches that do not control access points, but have mobility functions included in their repertoire of functions. Such switches offer assistance in the routing of the connections of wireless terminals.

A switch belonging to a wireless-specific group, which also belongs to a regular peer group, announces the rest of the nodes in the regular peer group, according to the standard PNNI protocol, via PTSE packages, that it has connection to a wireless-specific group. For example, the switch M.1 of FIG. 2, which is the member A.1.1 of the regular peer group A.1 (see also FIG. 1), announces the regular switches A.1.2–A.1.5 that it has connection to the group M.

In such a network structure, the connection can be routed via a wireless-specific structure, for instance by utilising some known ATM signalling protocol, such as the PNNI or B-ISUP protocol. When using standard PNNI messages, these switches do not have to be aware that the setup is connected to the handover of a wireless terminal, but they can function in similar fashion as in establishing any other regular connection.

The application of the invention in an ATM network using the PNNI protocol is only one preferred embodiment of the invention. The invention is not restricted to networks using the PNNI protocol, nor to ATM networks; here the PNNI protocol and the ATM network are only used for illustrating the details of the operation of a particular embodiment. The embodiment of FIG. 2 explained above is only meant for illustrating an exemplary preferred embodiment and application method of the invention.

FIG. 3a illustrates the connections between the nodes in the wireless-specific peer group M, i.e. the structure of the group, shown in FIG. 2. FIGS. 3b and 3c illustrate various tree topologies that can be defined in the structure of the wireless-specific group shown in FIG. 3a. For instance, if a wireless terminal located within the coverage area of an access point connected to the switch M.6 contacts for instance a fixed terminal connected to the switch A.1.5 of FIG. 2, the switch M.6 receives a setup request via its access point. Now the switch M.6 chooses the tree topology to be used in the routing of the connection to be established from among a number of predetermined tree topologies, for instance the tree topology illustrated in FIG. 3b. Thereafter the switch M.6 sends a setup command according to the PNNI protocol, provided with the identifier of the tree topology to be employed. Because the switch M.6 is aware, according to the PNNI protocol, that the switches M.1 and M.2 are in contact with the peer group A.1, the switch M.6 sends a setup command via the switch M.3 either to the switch M.1 or M.2, and the one that receives the command in turn forwards the setup command inside the group A.1 to the switch A.1.5.

According to the PNNI protocol, the addresses of regular peer groups must be used in setting up the connections. Consequently, in the above described procedure the switch M.6, i.e. the member A.3.2. of the regular peer group A.3, first establishes connection with the switch M.3, i.e. with the member A.2.1 of the regular peer group A.2. whereafter the switch M.3, i.e. the switch A.2.1, establishes connection with the switch M1/A.1.1. or the switch M2/A.1.2.

As another example, let us describe a situation where a fixed terminal contacts a wireless terminal. For example, if a terminal connected to the switch A.4.2 wishes to set up contact with a wireless terminal, the switch A.4.2 first sends a setup command to the switch A.4.3, i.e. to the switch M.4, because the switch A.4.2 is aware that the switch M.4 is in contact with the peer group M of the wireless terminals. The switch M.4/A.4.3 can choose as the tree topology to be employed, for example the tree topology according to FIG. 3c. If the desired wireless terminal is in contact with the access point connected to the switch M.8/B.2.1, the switch M.4/A.4.3 sets up connection first with the switch M.5/A.3.1, which in turn establishes connection with the switch M.8/B.2.1, which in turn establishes a new connection with a wireless terminal. If the wireless terminal later during the connection hands over to an access point under the control of some other switch, in the routing there is used the same tree topology by which the connection was originally routed, i.e. in this example the tree topology of FIG. 3c.

Any node of the tree topology can serve as the root thereof. Because the term 'root node' generally signifies a fixed root node, the term 'anchor node' is used here in order to avoid confusion—to describe a node serving as the root of the tree topology during the routing of a given connection. In the previous example of FIG. 3c, the switch M.4 served as the anchor node. When seen from the point of view of the switch M.4, the tree topology of FIG. 3c can also be illustrated in the manner represented in FIG. 4a. If the connection should have come, instead of the switch M.4 of the previous example, via the switch M.5 to a wireless-specific peer group, the switch M.5 would probably have served as the anchor node and chosen the tree topology to be used. From the point of view of the switch M.5, the tree topologies of FIGS. 3c and 3b are almost equally suitable, because in both cases the switch M.5 is fairly near to the centre point of the tree topology.

The switch M.5 can choose for instance the same tree topology as the switch M.4, in which case the tree topology from the point of view of the switch M.5 looks like the one represented in FIG. 4b.

In the above specification, we have described by way of example various embodiments in connection with an ATM network, but the method according to the invention can also be applied in other switched telecommunications networks. The invention is above described, by way of example, as applied in a network utilising the PNNI protocol. The invention is not, however, restricted to any particular protocol, but it can be utilised in telecommunications networks employing other protocols, too.

By means of the arrangement according to the invention, the advantages offered by the tree topology can be utilised in a network-structured telecommunications network. The drawbacks caused by a fixed tree topology can also be avoided by means of the present invention. For instance, the overloading of the root node is avoided by employing the invention, because the arrangement of the invention does not contain a fixed root node, but any node can serve as the anchor node corresponding to the root node, and in addition to this, the anchor node can vary connection by connection.

By employing the present invention, there can be utilised both the advantages of the tree topology and the large number of inter-switch data transmission connections, typical of the network structure.

It is obvious for a man skilled in the art that the different preferred embodiments of the invention are not limited to the described examples, but can vary within the scope of the appended patent claims.

What is claimed is:

1. A network-structured telecommunications network comprising switches and data transmission connections therebetween, where at least a certain number of the switches are arranged to control the routing of the connections in the telecommunications network according to a plurality of predetermined tree topologies, characterised in that each of the certain number of switches belonging to said plurality of predetermined tree topologies is arranged to serve as an anchor node of the plurality of predetermined tree topologies during routing and that a subset of the certain number of switches are provided with functions supporting wireless terminals, wherein each of the certain number of switches is arranged to choose, in the beginning of the routing controlled by said switch, a tree topology to be used in said routing, and wherein each of the switches belonging to the certain number of switches is arranged to choose, in the beginning of the routing controlled by said switch, the tree topology to be used in said routing, according to which tree topology's centre point is located nearest to the switch in question.

2. A telecommunications network according to claim 1, characterised in that said telecommunications network is an asynchronous transfer mode (ATM) network.

3. A telecommunications network according to claim 2, characterised in that said telecommunications network utilises a Private Network-Network Interface (PNNI) protocol, and that the certain number of the switches form at least one peer group according to the PNNI protocol.

4. A network structured telecommunications network comprising switches and data transmission connections therebetween, where at least a certain number of the switches are arranged to control the routing of the connections in the telecommunications network according to a plurality of predetermined tree topologies, characterised in that each of the certain number of switches belonging to said plurality of predetermined tree topologies is arranged to serve as an anchor node of the plurality of predetermined tree topologies during routing and that a subset of the certain number of switches are provided with functions supporting wireless terminals, wherein each of the certain number of switches is arranged to choose, in the beginning of the routing controlled by said switch, a tree topology to be used in said routing, and wherein the certain number of switches are arranged to transmit an identifier of the tree topology routing to be used by the certain number of switches participating in the routing.

5. A network structured telecommunications network comprising switches and data transmission connections therebetween, where at least a certain number of the switches are arranged to control the routing of the connections in the telecommunications network according to a plurality of predetermined tree topologies, characterised in that each of the certain number of switches belonging to said plurality of predetermined tree topologies is arranged to serve as an anchor node of the plurality of predetermined tree topologies during routing and that a subset of the certain number of switches are provided with functions supporting wireless terminals, wherein each of the certain number of switches is arranged to choose, in the beginning of the routing controlled by said switch, a tree topology to be used in said routing, and wherein the certain number of switches are arranged to forward an identifier of the tree topology in connection with a Private Network-Network Interface (PNNI) command used in the routing of the connection.

6. A routing method of a telecommunications network comprising switches and data transmission connections there between, which method uses for routing only those data transmission connections of a telecommunications network that belong to a predetermined tree topology, the predetermined tree topology selected from a plurality of tree topologies, characterised in that in said method, a switch serving as an anchor node of the predetermined tree topology controlling the routing is the switch from which the routing starts, wherein in the beginning of the routing procedure, there is chosen the predetermined tree topology to be used in the routing, and wherein said tree topology to be used is chosen on the basis of the fact as to which tree topology's centre point is located nearest to the switch from which the routing starts.

7. A routing method according to claim 6, charcterised in that a Private Network-Network Interface protocol is applied in the routing.

* * * * *